United States Patent [19]

Kulkarni et al.

[11] 4,097,548

[45] Jun. 27, 1978

[54] POLYESTER-CONTAINING HOT MELT ADHESIVE COMPOSITION

[75] Inventors: Mohan V. Kulkarni, Ashland; John Von Kamp, New London, both of Ohio

[73] Assignee: The Goodyear Tire & Rubber Company, Akron, Ohio

[21] Appl. No.: 809,479

[22] Filed: Jun. 23, 1977

[51] Int. Cl.² .............................................. C08L 67/06
[52] U.S. Cl. ................................... 260/873; 156/332; 260/75 R
[58] Field of Search .............. 260/873, 75 R; 156/332

[56] References Cited

U.S. PATENT DOCUMENTS

| | | | |
|---|---|---|---|
| 3,699,187 | 10/1972 | Gardziella | 260/860 |
| 3,929,938 | 12/1975 | Hadley et al. | 260/897 B |
| 3,959,062 | 5/1976 | Hoh et al. | 156/313 |
| 4,048,128 | 9/1977 | Eastman | 260/22 R |

Primary Examiner—Richard B. Turer
Attorney, Agent, or Firm—J. D. Wolfe

[57] ABSTRACT

A hot melt adhesive composition suitable for adhering polyester and polyvinyl fluoride compositions is prepared by making a blend of about 9 to 30 percent of a copolymer of ethylene and ethyl acrylate or methacrylate, about 40 to 45 percent of a copolyester of a terephthalate of ethylene and neopentyl glycol and about 50 to 55 percent of a terpolyester obtained by condensing ethylene glycol with a mixture of terephthalic acid, isophthalic acid and azelaic acid.

6 Claims, No Drawings

POLYESTER-CONTAINING HOT MELT ADHESIVE COMPOSITION

This invention relates to a composition suitable as a hot melt adhesive. More particularly, this invention relates to compositions having a softening point of about 215° to 225° C., a Shore D hardness of at least 50 to 60, a Brookfield Thermoseal melt viscosity at 245° C. of 1.450 poises comprised of about 9 to 30 percent by weight of a copolymer of ethylene-ethylacrylate or methacrylate, about 40 to 45 percent by weight of a copolyester terephthalate of ethylene glycol and neopentyl glycol, about 50 to 55 percent by weight of a terpolyester of the structure obtained by condensing ethylene glycol with a mixture of terephthalic acid (50 to 57%), isophthalic acid (1 to 7%), and azelaic acid (30 to 36%), and preferably an effective amount of an antioxidant, usually 0.5 to 1.5% to improve thermal stability.

Materials such as polyesters and polyvinyl fluoride can be extruded to form shaped articles such as fibers, films, and built-up or structural articles. It is desirable to shape and fasten these shaped articles together and, particularly desirable, is a hot melt adhesive for this purpose.

This invention provides a composition useful as a hot melt adhesive to form laminates of polyester, such as the polyethylene terephthalate or polyethylene/propylene terephthalate bodies or polyvinyl fluoride bodies. It has been learned that the hot melt adhesive preferably should have a softening point of 215° to 225° C., a Shore D hardness of 50 to 60, and a Brookfield Thermoseal melt viscosity at 245° C. of 1000 to 1500 poises to permit films of polyester and/or polyvinyl fluoride to be adhered together to form useful laminates. A composition having the above attributes as a hot melt adhesive is composed on a weight percent basis of about 9 to 30% of a copolymer of ethylene-alkyl acrylate or methacrylate having an alkyl radical of $C_1$ to $C_4$ carbon atoms and containing 18 to 23% of alkylacrylate or methacrylate, about 40 to 45% of a copolyester terephthalate of ethylene and neopentyl glycol, about 50 to 55% of a terpolyester of the structure obtained by condensing ethylene glycol with a mixture of terephthalic acid, isophthalic acid and azelaic acid, or their anhydrides, and an effective amount of an antioxidant. The copolyester terephthalates are condensation products of terephthalic acid or its anhydride with a mixture of the glycols of 2 to 5 carbon atoms with the amount of ethylene glycol preferably being from 60 to 70%, and the neopentyl glycol being from 40 to 30%, having an intrinsic viscosity at 25° C. of 0.55 to 0.66 and a glass transition temperature of 70° C.

The terpolyesters have the structure obtained by condensing ethylene glycol with from 50 to 57 mol percent of terephthalic acid or its anhydride, 1 to 7 mol percent isophthalic acid or anhydride, and 30 to 36 mol percent of azelaic acid or its anhydride, to give a composition having an intrinsic viscosity at 25° C. of 0.66 to 0.76 and a glass transition temperature of about −10° C.

The organo phosphonates are particularly effective antioxidants in these compositions. The organo radical can be an alkyl, aryl or cycloalkyl radical, preferably of 6 to 20 carbon atoms such as octyl, phenyl, nonyl and cyclohexyl.

The nature of this invention can be more readily appreciated by the following representative examples wherein all parts and percentages are by weight unless otherwise indicated.

EXAMPLE I

A blend containing 9.9 percent ethylene/ethyl acrylate (23% ethyl acrylate and a melt index of 20) and 90.10% of the mixture of the following composition:

|  |  | Percent |
|---|---|---|
| 57/7/36 | Ethylene-terephthalate/isophthalate azelate | 54.94 |
| 70/30 | Ethyl/neopentyl-terephthalate | 43.96 |
|  | Phosphonate, antioxidant | 1.10 |

This blend had a viscosity of 145,000 cps at 475° F. It yielded satisfactory bonds to the polyester (Mylar TM) and polyvinyl fluoride (Tedlar TM).

EXAMPLES II TO V

The blends of Table 1 were made by blending the ingredients together to give a uniform blend. These blends were used as a hot melt adhesive to prepare polyester (Mylar TM) laminates. These laminates were tested for adhesion under one pound load at room temperature and under dead load (1 pound) strength temperature. The result of these tests are shown in Table 1.

The test proceedure for Mylar TM and Tedlar TM laminates under load at room temperature and for dead load strength were prepared as follows: Hot melt compositions described in Table 1 were applied on films of Mylar TM and Tedlar TM (1 inch ×4 inches) on one square inch area using hot melt applicator (Nordson Model AD-25 TM) at 450°–500° F. under 40–60 psi pressure and immediately bonded with 1 inch ×4 inches film of the same type, so as to cover one square inch bonded laminate. The laminate was then heat pressed under pressure (PHI platen press, Model 0-230C-6-M3-D) of 500 to 800 psi and platen temperature of 250° to 275° F., for 15-30 seconds. Bonded laminates, thus, prepared of Mylar TM and Tedlar TM were then tested under conditions described in Table 1. The Brookfield Thermoseal melt viscosity was determined on Brookfield Viscometer Model HAT with an SC4-27 spindle.

Table 1

| Ingredients, parts by weight | Blend No. | | | |
|---|---|---|---|---|
|  | 2 | 3 | 4 | 5 |
| 60/40 Poly (ethylene terephthalate/isophthalate) IV = 0.65; MP = 186° C.; Tg = 66° C. | 50 | 50 | 50 | 70 |
| 70/30 Poly (ethylene/neopentyl terephthalate) IV = 0.66; MP = 174° C.; Tg = 70° C. | 50 | — | 40 | 20 |
| Poly (ethylene-ethyl acrylate) (containing 23% ethyl acrylate) | — | 50 | 10 | 10 |
| Antioxidant* | 1 | 1 | 1 | 1 |
| Adhesion Test on Mylar/Mylar$^{TM}$ laminate under 1 pound load at room temperature | Passed 4 days | Passed 7 days | Passed 7 days | Passed 7 days |
| Dead Load Strength |  |  |  |  |
| at 63° C. ⟶ 20 min. |  |  |  |  |
| at 82° C. ⟶ 60 min. | | 28 hrs. | 45 min. |

*O,O-di-N-octadecyl-3,5-di-tert-butyl-4-hydroxyl benzal phosphonate.

While certain representative embodiments and details have been shown for the purpose of illustrating the invention, it will be apparent to those skilled in this art that various changes and modifications may be made therein without departing from the spirit or scope of the invention.

What is claimed is:

1. A hot melt adhesive composition having a softening point of about 215° to 225° C., a Shore D hardness of at least 50 to 60; a Brookfield Thermoseal melt viscosity at 245° C. of 1000 to 1500 poises and comprised of about 9 to 30 percent by weight of a copolymer of ethylene and ethyl acrylate or methacrylate, about 40 to 45 percent by weight of a copolyester of a structure obtained by condensing terephthalic acid with a mixture of ethylene glycol and neopentyl glycol, about 50 to 55 percent by weight of a terpolyester of a structure obtained by condensing ethylene glycol with a mixture of terephthalic acid, isophthalic acid and azelaic acid.

2. The hot melt adhesive of claim 1, wherein the copolymer of ethylene and ethyl acrylate or methacrylate has a melt index of 5 to 20.

3. The hot melt adhesive of claim 2, wherein the copolymer of ethylene and ethyl acrylate or methacrylate contains up to about 23 percent by weight of ethyl acrylate or methacrylate.

4. The hot melt adhesive of claim 1, wherein the copolyester terephthalate has an intrinsic viscosity of 0.55 to 0.66 and a glass transition temperature of about 70° C.

5. The hot melt adhesive of claim 1, wherein the terpolyester has an intrinsic viscosity at 25° C. of 0.66 to 0.76.

6. The hot melt adhesive of claim 5, wherein the terpolyester has a glass transition temperature of −5° to −10° C.